(12) United States Patent
Sharma

(10) Patent No.: US 8,799,374 B2
(45) Date of Patent: Aug. 5, 2014

(54) METHOD AND APPARATUS FOR SEARCH HISTORY BASED MESSAGING

(75) Inventor: Ajay K. Sharma, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 319 days.

(21) Appl. No.: 12/849,937

(22) Filed: Aug. 4, 2010

(65) Prior Publication Data

US 2011/0035455 A1    Feb. 10, 2011

Related U.S. Application Data

(60) Provisional application No. 61/231,864, filed on Aug. 6, 2009.

(51) Int. Cl.
*G06F 15/16* (2006.01)

(52) U.S. Cl.
USPC ............................................ 709/206; 709/246

(58) Field of Classification Search
USPC .................. 709/203–207, 246, 238, 217, 224
See application file for complete search history.

(56) References Cited

U.S. PATENT DOCUMENTS

| | | | | |
|---|---|---|---|---|
| 6,078,740 | A * | 6/2000 | DeTreville | 703/22 |
| 7,458,184 | B2 * | 12/2008 | Lohtia | 455/456.3 |
| 7,587,482 | B2 | 9/2009 | Henderson et al. | |
| 7,996,473 | B2 * | 8/2011 | Braam | 709/206 |
| 8,180,680 | B2 * | 5/2012 | Leventhal | 705/26.1 |
| 2004/0087326 | A1 | 5/2004 | Dunko et al. | |
| 2005/0071434 | A1 * | 3/2005 | Hettish et al. | 709/207 |
| 2005/0243978 | A1 * | 11/2005 | Son et al. | 379/88.13 |
| 2006/0031586 | A1 * | 2/2006 | Sethi et al. | 709/246 |
| 2006/0033809 | A1 | 2/2006 | Farley | |
| 2007/0073837 | A1 * | 3/2007 | Johnson-McCormick et al. | 709/217 |
| 2007/0143281 | A1 | 6/2007 | Smirin et al. | |
| 2007/0213076 | A1 * | 9/2007 | Mian et al. | 455/466 |
| 2008/0104030 | A1 * | 5/2008 | Choi et al. | 707/3 |
| 2009/0063379 | A1 * | 3/2009 | Kelly | 706/46 |
| 2009/0075680 | A1 | 3/2009 | Carroll | |
| 2009/0083362 | A1 * | 3/2009 | Svendsen | 709/201 |
| 2009/0259621 | A1 | 10/2009 | Svendsen et al. | |
| 2010/0027777 | A1 * | 2/2010 | Gupta et al. | 379/210.01 |
| 2010/0332602 | A1 * | 12/2010 | O'Sullivan et al. | 709/206 |
| 2011/0167145 | A1 * | 7/2011 | Bush et al. | 709/223 |

FOREIGN PATENT DOCUMENTS

| | | |
|---|---|---|
| EP | 1164765 | 12/2001 |
| WO | 2007127968 | 11/2007 |

OTHER PUBLICATIONS

International Search Report and Written Opinion—PCT/US2010/044796—International Search Authority, European Patent Office, Nov. 15, 2010.

* cited by examiner

*Primary Examiner* — Joshua Joo
(74) *Attorney, Agent, or Firm* — Abdollah Katbab

(57) ABSTRACT

Methods and apparatus for providing messages, such as a recommendation, to one or more recipients may include receiving a message intended for one or more recipients. The methods and apparatus may further include determining the format of the message along with forwarding information for the one or more recipients. The methods and apparatus may also include forwarding the message to the one or more recipients based upon the forwarding information.

31 Claims, 10 Drawing Sheets

METHOD AND APPARATUS FOR SEARCH HISTORY BASED MESSAGING

CLAIM OF PRIORITY UNDER 35 U.S.C. §119

The present application for patent claims priority to Provisional Application No. 61/231,864 entitled "Contacts, Mobile Data Services and Contents Server Management and Recommendation Tool" filed Aug. 6, 2009, and assigned to the assignee hereof and hereby expressly incorporated by reference herein.

BACKGROUND

1. Field

The following relates generally to wireless communications and, more particularly, to providing an interface for managing and updating contact information and settings, as well as providing messages, such as recommendations, to one or more contacts.

2. Background

In today's world, wireless communication systems are widely deployed to provide various types of content, including voice, video, music, text and data, for example. Wireless devices, such as cellular telephones or handheld devices having wireless connection capability are deployed leveraging the wireless communication system by users for communicating and interacting with each other. Typically users create contact lists on the wireless devices with contact information, such as names, telephone numbers and addresses, for aiding users in contacting individuals and/or businesses. Moreover, users may backup the contact information on storage devices and/or computing devices that are remote from the wireless device in case the wireless device is lost and/or damage and the contact information is no longer accessible through the user's wireless device.

Generally when a contact list stored on a wireless device is backed up, e.g., on a storage device and/or server, settings created for the contact list, such as groupings of contacts are not typically backed up. Thus, if a user switches wireless devices and/or a wireless device is lost, the backed up contact list information may be transferred to a new wireless device from the storage device and/or server. When the contact information is transferred to the new wireless device, the settings, e.g., the information relating to the groups previously created for the contact list, however, are not typically transferred to the wireless device. In addition, different wireless devices and network operators generally have different functionality and interfaces for managing contacts stored on the wireless device. Therefore, when users switch wireless devices or change network operators, the users must learn the new functionality and interfaces for managing the contacts in addition to losing previously created settings for the contacts. Thus, it may be advantageous to have a consistent interface for managing contacts between wireless devices.

Therefore, there remains a need in the art for methods and systems for managing contacts in a consistent manner while maintaining previously created settings for the contacts.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for processing messages. The method may include receiving, at a computing device, a message intended for one or more recipients. The method may also include determining a format of the message and forwarding information for the one or more recipients. The method may further include determining for each of the one or more recipients whether the recipient is capable of receiving the format of the message based upon the forwarding information for the recipient; wherein if the recipient is capable of receiving the format of the message, forwarding the message to the recipient; and wherein if the recipient is not capable of receiving the format of the message, the format of the message is converted into a new format capable of being received by the recipient and forwarding the message with the new format to the recipient.

Another aspect relates to at least one processor configured to process messages. The processor may include a first module for receiving, at a computing device, a message intended for one or more recipients. In addition, the processor may include a second module for determining a format of the message and forwarding information for the one or more recipients. Moreover, the processor may include a third module for determining for each of the one or more recipients whether the recipient is capable of receiving the format of the message based upon the forwarding information for the recipient; wherein if the recipient is capable of receiving the format of the message, forwarding the message to the recipient; and wherein if the recipient is not capable of receiving the format of the message, the format of the message is converted into a new format capable of being received by the recipient and forwarding the message with the new format to the recipient.

Yet another aspect relates to a computer program product. The computer program product may include a computer-readable medium including at least a first set of codes for causing a computer to receive, at a computing device, a message intended for one or more recipients. The computer-readable medium may additionally include a second set of codes for causing the computer to determine a format of the message and forwarding information for the one or more recipients. Further, the computer-readable medium may include a third set of codes for causing the computer to determine for each of the one or more recipients whether the recipient is capable of receiving the format of the message based upon the forwarding information for the recipient; wherein if the recipient is capable of receiving the format of the message, forwarding the message to the recipient; and wherein if the recipient is not capable of receiving the format of the message, the format of the message is converted into a new format capable of being received by the recipient and forwarding the message with the new format to the recipient.

Another aspect relates to an apparatus. The apparatus may include means for receiving, at a computing device, a message intended for one or more recipients. The apparatus may also include means for determining a format of the message and forwarding information for the one or more recipients. In addition, the apparatus may also include means for determining for each of the one or more recipients whether the recipient is capable of receiving the format of the message based upon the forwarding information for the recipient; wherein if the recipient is capable of receiving the format of the message, forwarding the message to the recipient; and wherein if the recipient is not capable of receiving the format of the message, the format of the message is converted into a new format capable of being received by the recipient and forwarding the message with the new format to the recipient.

Yet another aspect relates to an apparatus for processing messages. The apparatus may include a recommendation component operable for receiving a message intended for one or more recipients. The apparatus may further include a forwarding component operable for determining a format of the message and forwarding information for the one or more recipients. The apparatus may additionally include the forwarding component operable for determining for each of the one or more recipients whether the recipient is capable of receiving the format of the message based upon the forwarding information for the recipient; wherein if the recipient is capable of receiving the format of the message, forwarding the message to the recipient; and wherein if the recipient is not capable of receiving the format of the message, the format of the message is converted into a new format capable of being received by the recipient and forwarding the message with the new format to the recipient.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and apparatus for managing contact information, such as contact names, contact numbers and contact settings in a consistent manner across various wireless devices. The described aspects also relate to storing and transferring the stored contact information and/or settings to one or more wireless devices. Thus, if a user switches wireless devices and/or network operators, the contact information and/or settings may be maintained and transferred to the wireless devices. In addition, the described aspects relate to providing messages, such as recommendations, to one or more recipients, e.g., contacts listed in the contact list and/or groups of contacts. Moreover, the described aspects relate to forwarding a message via a variety of communication methods, such as via a telephone number, an e-mail address, or a social networking address, to one or more recipients.

Figure 1:
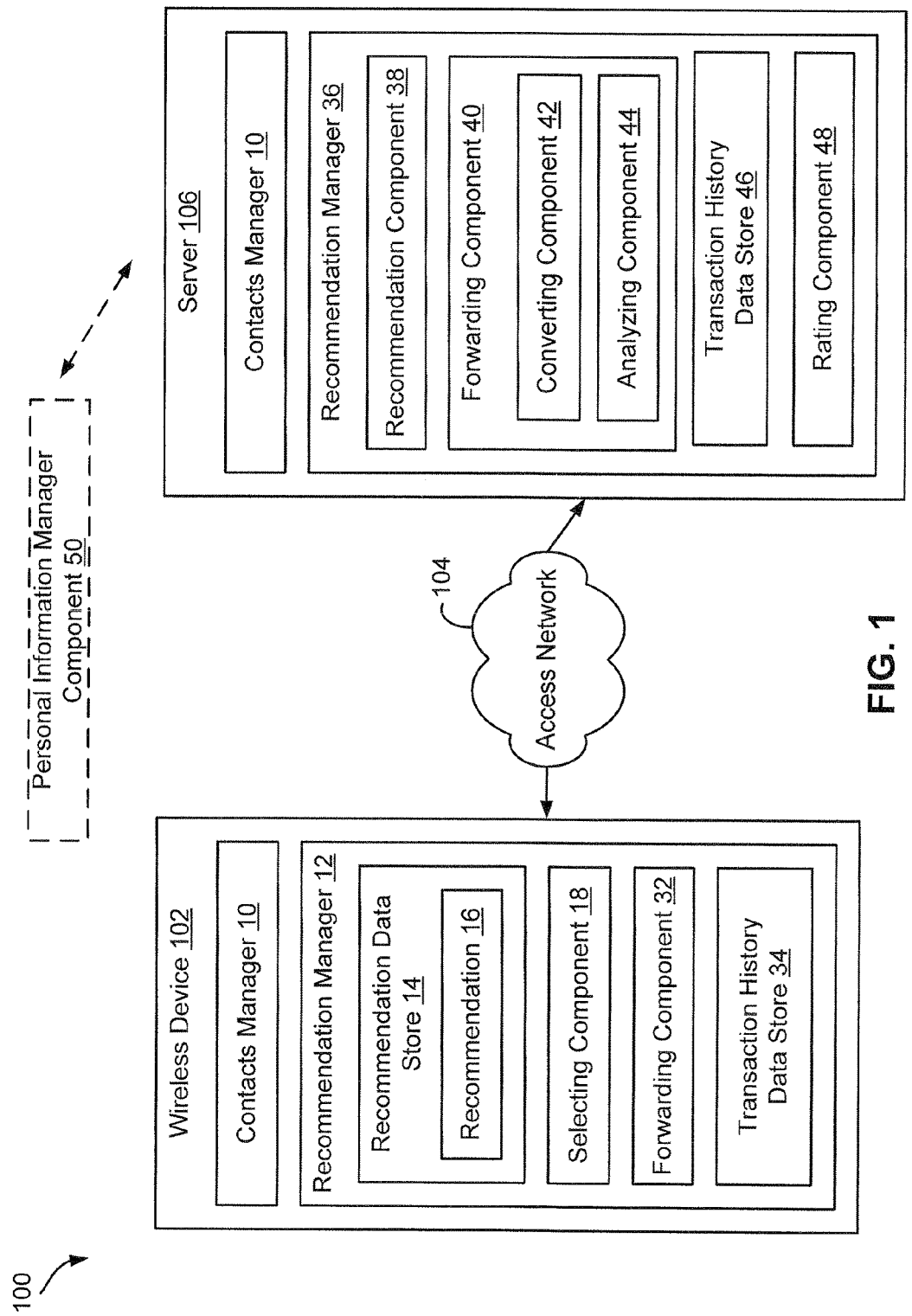
FIG. 1 is an illustration of a connectivity system in accordance with an aspect.

Turning now to FIG. 1, illustrated is an example connectivity system 100 that includes one or more wireless devices 102 communicating through one or more access networks 104 with one or more servers and/or computing devices 106. Wireless device 102 may include any mobile or portable computing or communications device, such as a cellular device, that may connect to an access network 104. Wireless device 102 may be, for example, a cellular telephone, a navigation system, a computing device, a camera, a PDA, a music device, a gaming device or a handheld device having wireless connection capability, among other devices. Server/computing device 106 may include any mobile or fixed computing device connected to a network. Sever/computing device 108 may include, but is not limited to, a computing device, a server, a cellular telephone, a camera, a PDA, a music device, a gaming device, a navigation system, or a handheld device having wireless connection capability, among other devices. Furthermore, access network 104 may provide one or more types of communication connections, such as any type of wireless airlink, to wireless device 102 and server 106. Wireless device 102 may place and/or receive a communication, e.g., a telephone call, a video conferencing call, an Internet Protocol session, such as a SKYPE™ session, a voice over internet protocol (IP) call, a short message service (SMS) message, a multimedia messaging service (MMS) message, an instant messaging (IM) service message, a chat or netmeeting related connection, a video, music, or data transfer, among other communications, via access network 104 to one or more servers 106. In addition, wireless device 102 may receive a communication via access network 104 from one or more servers 106, or from any other device in communication with access network 104.

Wireless device 102 may include a contacts manager 10 operable for creating, updating, and storing contact information of one or more contacts, such as but not limited to contact names, contact numbers and contact settings, including contact groups, on wireless device 102. Contact information may include, but is not limited to, information relating to individuals, such as friends, family, co-workers, physicians, and/or places of business, among other contacts. Thus, a user may enter and/or update the contact information via a user interface on wireless device 102.

Server 106 may also include a contacts manager 11 operable for creating, updating and storing contact information. Contacts manager 10 of wireless device 102 may communicate via access network 104 with the contacts manager 11 of server 106 providing server 106 to exchange the contact information created and/or updated from wireless device 102.

In addition, contacts manager 11 of server 106 may communicate via access network 104 with the contact manager 10 of wireless device 102, providing wireless device 102 with updates and/or changes in the contact information. By synchronizing the data from sever 106 with wireless device 102, the contact information of wireless device 102 may be managed and/or modified remotely by server 106. Moreover, any previously stored information may be transferred during the synchronization process. For example, a user may use a computer to communicate via the internet with a wireless device to add contacts, change contact information, and/or contact settings. The data synchronization between wireless device 102 and server 106 may occur, for example, periodically, when wireless device 102 launches the contacts manager 10, or when changes occur in the contact information either on the wireless device 102 and/or server 106. In addition, if a user changes wireless devices, the contact information and contact settings may be transferred from server 106 to the new wireless device. Therefore, a user may maintain a consistent interface for managing contacts and maintain previously created contacts and contact settings regardless of changes in wireless devices and/or network operators.

Moreover, if a user has multiple wireless devices, then the contacts manager 11 on the server 106 may synchronize with each wireless device obtaining the contact information from each wireless device. Therefore, server 106 may maintain a single contact list which contains all the contact information from each of the wireless devices.

In an aspect, contacts manager 11 may also communicate with an external personal information manager (PIM) component 50 that has contact information stored on the PIM component 50. Thus, contacts manager 10 may use the contact information from the PIM component 50 and/or provide updates and/or changes to the contact information stored on the wireless device 102.

Figure 2:
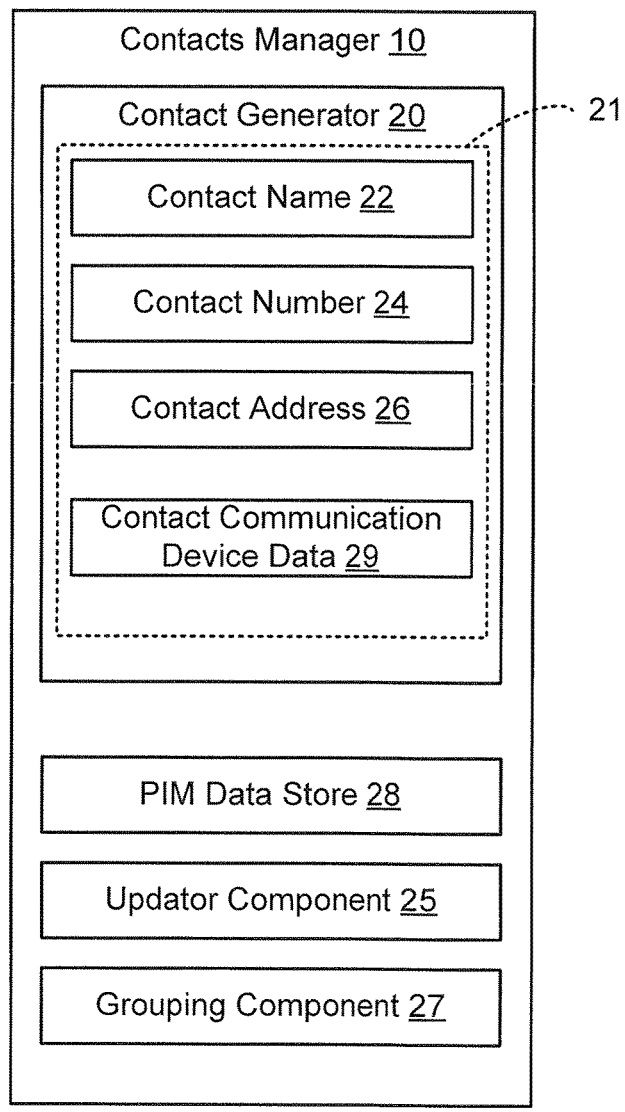
FIG. 2 is an illustration of an example contacts manager component in accordance with an aspect.

Turning now to FIG. 2, illustrated is an example contacts manager 10 or 11, respectively operable within wireless device 102 or server 106 in accordance with an aspect. It is noted that contacts manager 10 of wireless device 102 (FIG. 1) is illustrated, however, the following description applies as well to contacts manager 11 of server 106 (FIG. 1). Contacts manger 10 may include a contact generator 20 operable for generating contact information 21, including but not limited to a contact name 22, a contact number 24, and a contact address 26, among other contact-related information, such as an e-mail address, a business name, a birth date, etc. In one aspect, wireless device 102 (FIG. 1) may receive inputs from a user via other wireless device components, such as, a wired or wireless communication interface, a keypad, or a touch sensitive display, among others sources of input. The input may include, for example, the contact name 22, the contact number 24, and the contact address 26 of a given contact. In addition or alternatively, the wireless device 102 may receive a call and/or message from another communication device, such as a cellular telephone or a handheld device having wireless connection capability, and the wireless device 102 may extract the contact number 24 of the incoming call from the information provided by the network operator relating to the incoming call and/or message. Therefore, the contact information 21, e.g., the contacts names and numbers, etc., may be generated by extracting the information from the network operator without the user entering in the contact numbers 24 or other contact-related information.

In addition, the contact information 21 may also include contact communication device data 29. The contact communication device data 29 may include, but is not limited to, the type of communication device the contact is using (e.g., a cellular telephone, a PDA, a music device, or a gaming device), the functionalities of the device (e.g., playing music and/or videos, browsing the internet, taking pictures), the network operator of the device, and the version of the device, among other communication device data.

Figure 3:
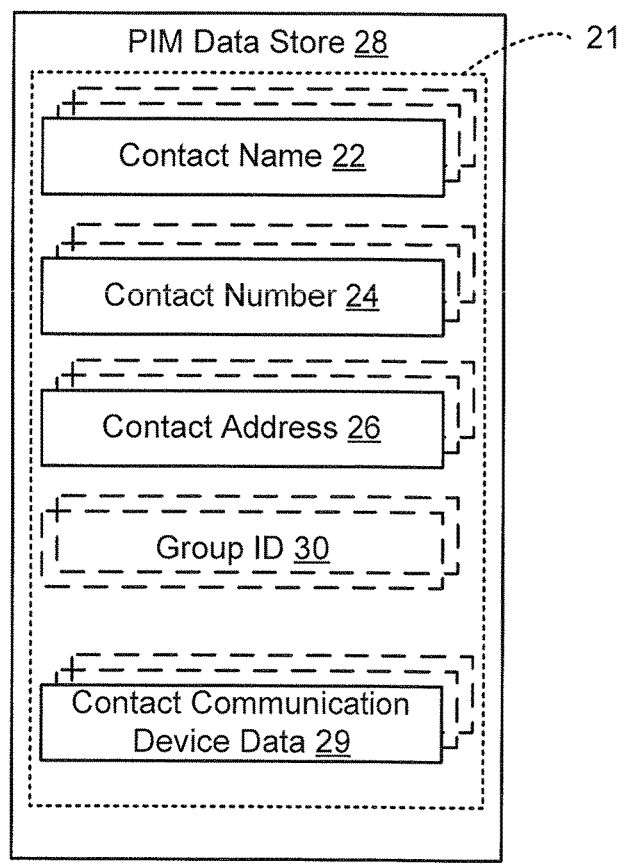
FIG. 3 is an illustration of a personal information manager (PIM) data store component in accordance with yet another aspect.

The contacts manager 10 (or 11) may include a personal information manager (PIM) data store 28 operable for storing the contact information 21, such as the contact names 22, the contact numbers 24 and the contact addresses 26, as illustrated in FIG. 3. For example, PIM data store 28 may include one or more contact names 22 and/or contact addresses 26 for individuals and/or businesses listed in the PIM data store 28. The contact addresses 26 may include, but are not limited to, a street address, an e-mail address, a network address, or a social networking site associated with the contact, among other addresses. In addition, PIM data store 28 may include one or more contact numbers 24 and/or contact addresses 26 associated with the one or more contact names 22 and/or contact addresses 38. Thus, it should be appreciated that a contact name 22 may have one or more contact numbers 24 and/or contact addresses 26 associated with the contact name 22. Additionally, PIM data store 28 and/or contact information 21 may also include a group identification (ID) 30, such as a group name and/or icon for identifying whether the contact name 22 is associated with a group, e.g., friends, family, co-workers, a chat group, or a professional organization, among others. It should be appreciated that a contact name 22 may have one or more group IDs 30 associated with the contact name 22. Moreover, it should be appreciated that a contact name 22 may have one or more communication devices, and therefore, may have one or more contact communication data 29 associated with the contact name 22. Thus, as contact information 21 is generated by the contact generator 20 (FIG. 2), the contact information 21, such as contact names 22, contact numbers 24, contact addresses 26, the group ID 30, and the contacts communication device data 29 may be stored in the PIM data store 28.

Referring back to FIG. 2, client contact manager 10 or 11 may also include a grouping component 27 operable for placing the contacts into groups, wherein each group may correspond to a respective group ID 30 (FIG. 3). Groups may include, but are not limited to, friends, family, co-workers, chat groups, or professional organizations, among others. For example, wireless device 102 may receive inputs from a user indicating a group for the contact, such as family, and the grouping component 27 may update the group ID 30 for the contact indicating the type of group the contact has been placed in. Once a group of contacts has been created, the group may be pushed from the wireless device 102 to the server and/or computer 106 to back up the changes in the group ID 30 for the contacts on the server and/or computer 106.

Contact manager 10 (or 11) may further include an updator component 25 operable to edit and/or update the contact information 21, such as the contact name 22, the contact number 24, the contact address 26 and/or the contact group ID 30. Thus, as the contact information 21 is changed and/or edited, the updator component 25 may update the information stored within the PIM data store 28. For example, wireless device 102 (FIG. 1) may receive inputs indicating that the contact information 21 has changed, e.g., the contact name and/or number has changed, and the updator component 25 may make the appropriate changes to the information stored in the PIM data store 28 based upon the received information.

Referring back to FIG. 1, wireless device 102 may also include a recommendation manager 12 operable for receiving recommendations for one or more contacts and a selection of one or more contacts that should receive the recommendations. Recommendation manager 12 may include a recommendation data store 14 operable to receive and store the received recommendations 16. Recommendations 16 may include, but are not limited to, a message, an application stored on wireless device 102, a voice message, a song, a video, a URL link, a short message service (SMS) message, a multimedia messaging service (MMS) message, an instant messaging (IM) service message, among other recommendations. Recommendation manager 12 may also include a selecting component 18 operable for selecting contact names 22 (FIG. 2) from the PIM data store 28 (FIG. 2) for receiving the recommendations 16. In addition, recommendation manager 12 may include a forwarding component 32 operable for forwarding the received recommendations 16 and the selection of contacts that should receive the recommendations 16.

For example, wireless device 102 may receive an input from a user selecting a game that the user is playing on wireless device 102 for recommending to a group of contacts stored in the PIM data store 28. Thus, the recommendation data store 14 may store the game the user is playing while the selecting component 18 may aid the user in selecting a group of contacts, e.g., friends, to receive the recommendation for the game. Once the user selects the group of contacts, the forwarding component 32 may communicate via access network 104 with recommendation manager 36 on server 106 forwarding the selected recommendations and/or the selected contact information 21, e.g., contact names 22, contact number 24 (FIG. 2), and contact address 26 (FIG. 2), to server 106 so that server 106 may forward the recommendations 16 or contact information 21 to the appropriate contacts. In an alternative aspect, forwarding component 32 may forward the recommendations 16 or contact information 21 directly to the contacts selected by the selecting component 32.

Recommendation manager 12 may further include a transaction history data store 34 operable for storing and/or tracking the recommendations 16 forwarded by wireless device 102. The transaction history data store 34 may store, for example, transaction history information for each recommendation 16 sent. The transaction history information may include, but is not limited to, the contact information 21 such as the contact names 22, the group ID 30, the date and time corresponding to each recommendation that was forwarded, the application type (e.g., song, video, URL link, voice message, game, MMS message, or SMS message), and application information (e.g., the artists of the song, type of game, or movie genre), among other transaction history information.

In an aspect, the transaction history data store 34 may also store additional comments and/or taglines associated with the recommendations 16. Additional comments and/or taglines may include a user rating, e.g. whether a user likes and/or dislikes the recommendation, a theme for the recommendation (e.g., country music songs, or action films), and the names of contacts that share a common interest with the item being recommended, among other comments. In addition, the transaction history data store 34 may store information relating to received transactions, e.g., recommendations 16 that other users and/or contacts are forwarding to the wireless device 102.

The transaction history data store 34 may include functionality that enables searching and/or filtering of the transaction history information. For example, the recommendations 16 may be filtered by contact name 22, such that only the recommendations forwarded to the selected contact name 22 are identified, such as on a display. Thus, the transaction history data store 34 may be used for generating reports based upon the transaction history information.

In an optional aspect, wireless device 102 may automatically determine which contacts should receive recommendations 16 based upon inputs from other wireless devices components. The inputs may include contextual inputs regarding the current activities of the user and/or the one or more contacts. The current activities may include, but are not limited to, the time of day, date information (e.g., the day, month and/or year), the location of the wireless device, a game that the user and/or the one or more recipients is playing, an application that the user and/or the one or more recipients is using, or a song or video that the user and/or the one or more recipients is listening to and/or watching, among other current activities. The server and/or wireless device may receive inputs from other wireless device and server components, such as, but not limited to, a clock, a position location module, a camera, a microphone, a thermometer, a memory or database, a wired or wireless communication interface, a keypad, or a touch sensitive display, among others sources of input. In addition, the server and/or wireless device may receive inputs from the user indicating the user's current context. For example, wireless device 102 may determine that a user is listening to a song by an artist and, based on the transaction history information stored within the transaction history data store 34, the wireless device may determine that the user previously recommended a different song by the same artist to a contact or a group of contacts. The wireless device 102 may automatically forward the song that the user is currently listening to as a recommendation to the same individual or group of contacts that previously received the song recommendation from the user.

Thus, the wireless device 102 and/or server 106 may use information relating to the user's current context, e.g., the type of song the user is listening to, the games the users are playing, or the location of the user, to automatically send recommendations based upon the contextual information. In addition, the wireless device 102 and/or server 106 may use contextual information relating to the one or more recipients of the recommendation 16 to automatically forward recommendations to the one or more recipients.

In addition, server 106 may include a recommendation manager 36 that includes a recommendation component 38 operable for receiving recommendations 16 and/or a selection of contacts that should receive the recommendations 16 from wireless device 102. Recommendation manager 36 may also include a forwarding component 40 operable for forwarding the recommendations 16 to the selected contacts. The forwarding component 40 may communicate with contacts manger 10 for obtaining the contact's contact information, such the contact number 22 (FIG. 2), the contact address 26 (FIG. 2), or the contact group ID 30 (FIG. 3), among other contact information.

The forwarding component 40 may also include an analyzing component 44 operable for analyzing the format and/or type of recommendation 16 being forwarded. For example, the format of the recommendation 16 may include, but is not limited to, a song, a video, an URL link, a voice message, a game, a MMS message, or a SMS message. In addition, the analyzing component 40 may also be operable for analyzing the forwarding information, e.g., contact information 21, for the one or more contacts selected to receive the recommendation 16. For example, the analyzing component 44 may determine the type of contact number 24, e.g., a mobile telephone number or landline telephone number, for the one or more contacts. In addition, the analyzing component 44 may determine the communication address for the one or more contacts, such as an e-mail address or social networking communication address. In an aspect, the analyzing component 44 may compare the type of recommendation 16 being forwarded to the forwarding information, e.g., the type of contact information 21 for the one or more contacts, and may determine for each contact, the optimal manner for forwarding the recommendation 16 to the one or more contacts based upon the type of recommendation 16 and/or the type of contact information 21.

In another aspect, if the recipient has multiple contact methods, e.g., a mobile telephone number and an e-mail address, based upon the type of message being forwarded, the analyzing component 44 may chose the contact method that may be most optimal for receiving the recommendation. For example, if the recommendation 16 is a song and the recipient's wireless device is capable of listening to a song, the analyzing component 44 may determine that the optimal manner for forwarding the song is through a message to the contact's mobile number instead of sending an e-mail to the contact with the song.

In addition, the forwarding component 40 may also include a converting component 42 operable for converting and/or changing the recommendation 16. The converting component 42 may communicate with the analyzing component 44 for determining whether changes should be made to the recommendation 16. In an aspect, the analyzing component 44 may further be operable for analyzing the type of communication device the recommendation 16 is intended for and the converting component 42 may tailor the recommendation for the particular communication device. For example, if the contact has a particular version of a wireless device that may not be capable of receiving the recommendation, the analyzing component 44 may detect the version of the wireless device and the converting component 42 may modify the recommendation 16 in such a manner that the communication device of the one or more contacts may receive the recommendation 16 from the forwarding component 40. For example, the recommendation 16 may be a text message and the communication device of the recipient may be a landline telephone. Thus, the analyzing component 44 may communicate with the converting component 42 for converting the text message to speech and the forwarding component 40 may forward the converted recommendation to the landline telephone number of the contact. In another example, the recommendation 16 may include a version of a game or application that the recipient's communication device does not support. Thus, the analyzing component 44 may recommend that the contact download a version of the game and/or application that the recipient's communication device does support. While the analyzing component 44 is illustrated and discussed in regards to the server 106, it should be appreciated, however, that the wireless device 102 may also perform the functionality described in relation to the analyzing component 44.

Recommendation manager 36 may also include a transaction history data store 46. It should be appreciated that transaction history data store 46 may have similar functionality as that discussed above in regards to the transaction history data store 34 on wireless device 102. The transaction history data store 46 may also track the system level data relating to the recommendations. The system level data may include, for example, determining whether the one or more contacts acts on the recommendations 16, such as purchasing the song that was recommend, clicking on a URL link forwarded, or downloading the game and/or application that was forwarded. In addition, the transaction history data store 46 may use the transaction history information to generate reports indicating what activities have taken place, e.g., user downloading the recommendations, listening to the songs, playing the games, selecting the URL link for determining where the interests lies from the contacts and what activities have resulted based upon the recommendations forwarded. This may be helpful in determining the popularity of a product and/or a user recommending the products.

Recommendation manager 36 may also communicate with recommendation manager 12 on wireless device 102 via access network 104 providing wireless device 102 an update on the status and/or success of forwarding the recommendations 16 to the selected contacts. Therefore, a user may send a single recommendation to multiple contacts via the server 106 and track whether the one or more recipients used the recommended information.

In addition, the recommendation manager 36 may include a rating component 48 operable for rating the recommendation 16. The rating component 48 may use the information from the transaction history data store 46 in determining the rating of the recommendation 16 based upon the number of recipients who responded to the recommendation. For example, if multiple recipients of the recommendation 16 downloaded and/or used the information recommended, then the rating component 48 may rate the recommendation 16 more highly than if the recommendation 16 was not used by the recipients. In addition, the rating component 48 may determine how to rate a recommendation 16 based upon the number of people who potentially may view and/or receive a user's recommendation 16 on a social network site. For example, if a user has a large number of contacts on a social networking site, then the user may have a higher rating for the recommendations 16 that the user sends out through the user's social network site.

In an aspect, the ratings from recommendations 16 may be converted into rewards points usable for purchasing products and/or rewards. Thus, as a user obtains reward points, the user may use the rewards points for purchasing products, such as additional applications, songs, or games, among other rewards and discounts.

Figure 4:
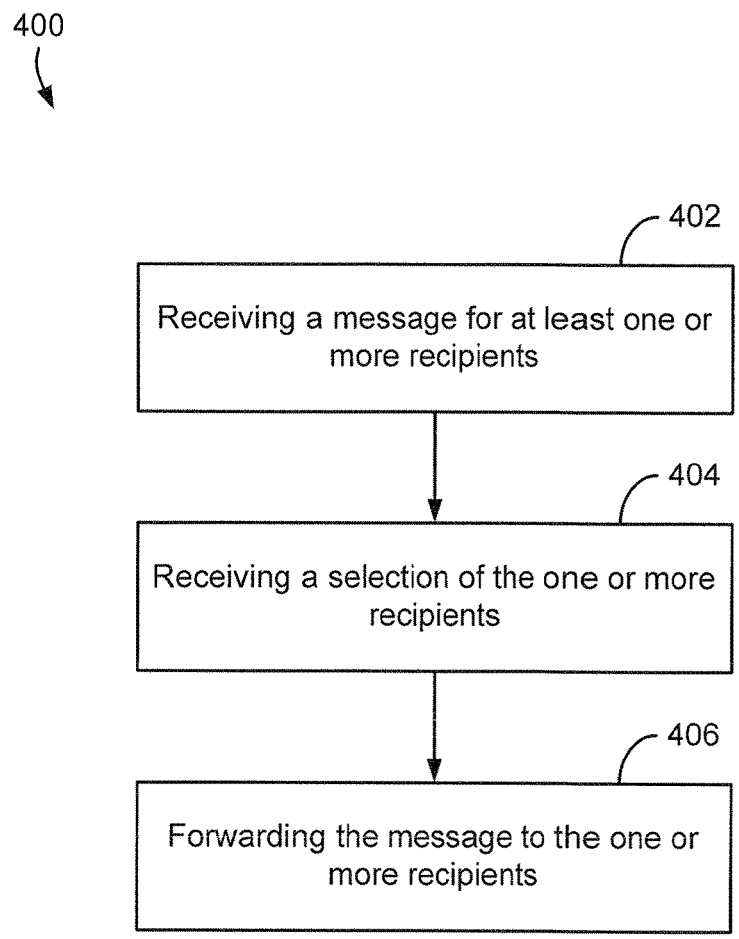
FIG. 4 is a flow chart illustrating a method for processing messages in accordance with another aspect.

Turning now to the method 400 illustrated in FIG. 4, for processing messages in accordance with an aspect. At 402, the method includes receiving a message for at least one or more recipients. For example, the message may be input or identified by a user of a wireless device, such as wireless device 102, or automatically generated by a component of a device, such as a recommendation manager 12 or 36 (FIG. 1) respectively of wireless device 102 or server 106 (FIG. 1). The message may include a recommendation, such as an application stored on a wireless device, a voice message, a song, a video, a URL link, a text message, a SMS message, a MMS, or an IM, among other recommendations. For example, the wireless device may receive inputs with the recommendations from a user and/or other wireless device components and/or sensors. In other aspects, for example, the message may include contact information.

Next, at 404, the method may include receiving a selection of the one or more recipients. The one or more recipients may be included in a contact list, e.g., contacts stored in a PIM data store on a wireless device and/or a remote server or computing device. The one or more recipients may be selected as a group or selected individually. At 406, the method may also include forwarding the message to the one or more recipients. The message may be forwarded based upon forwarding information for the recipient, such as a telephone number and/or address. Forwarding the message may result in notifying the one or more recipients of the message, such as through an alert (e.g., a beep, a ringtone, a vibration, or a flashing light, among other alerts), or a message on a display and/or interface. The notification may also include the message-originating user's name and/or the source of the recommendation. For example, the one or more recipients may receive a SMS message with a URL linking the one or more recipient to the recommendation. In addition, the one or more recipients may receive a MMS message with a video and/or voice message containing the recommendation. It should be appreciated that the one or more recipients may receive notifications of the message, such as a recommendation, in a variety of manners. Moreover, it should be appreciated that the one or more recipients may access the message, such as a recommendation, directly, e.g., clicking on the link in the SMS message, downloading a song, game or application, or watching a video, or the one or more recipients may store the message, such as a recommendation, for accessing at a later time, among other methods for accessing the message. Forwarding the message to the one or more recipients is discussed in greater detail below in regards to FIG. 5.

Figure 5:
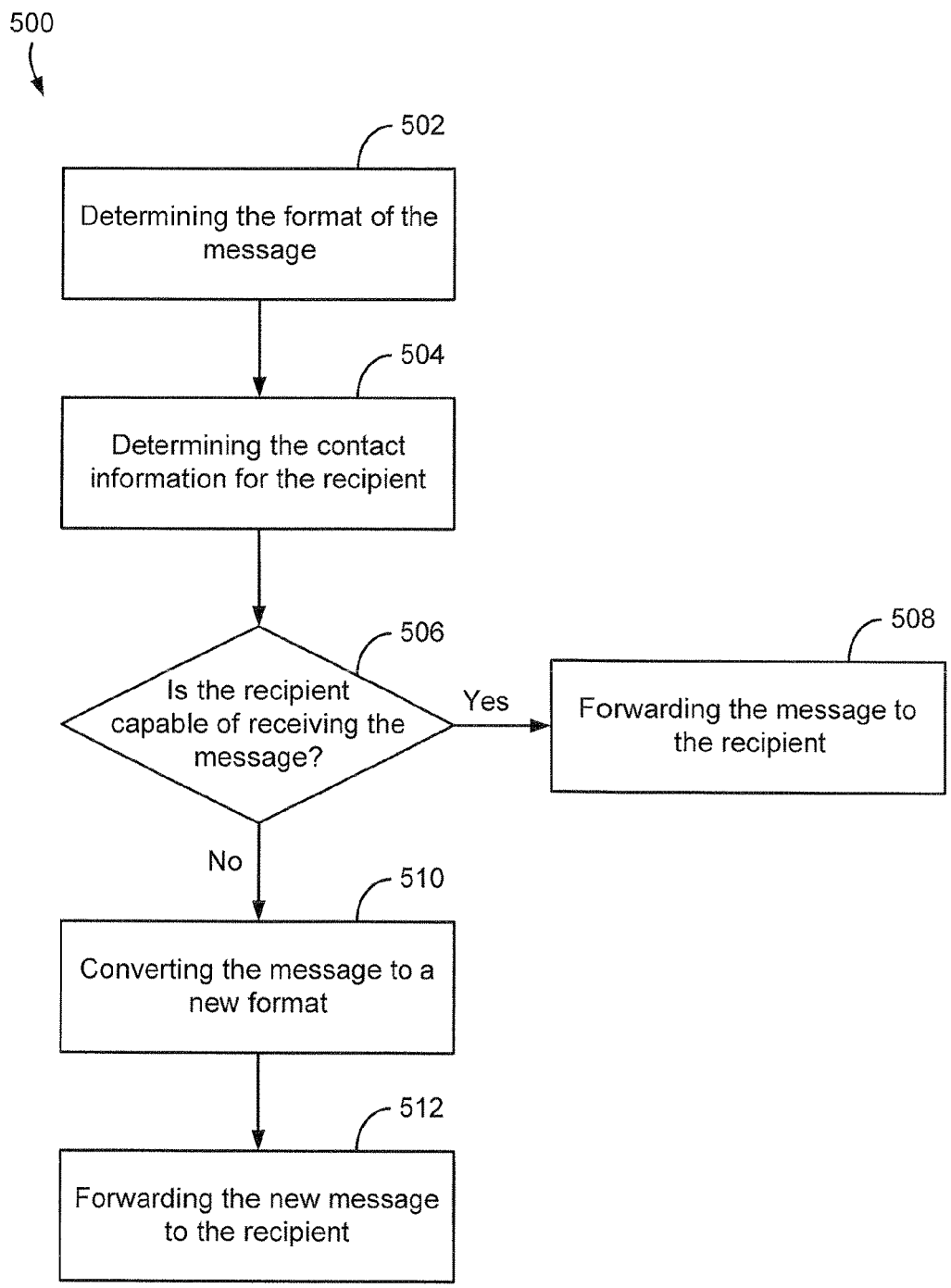
FIG. 5 is a flow chart illustrating a method for forwarding a message in accordance with yet another aspect.

Referring now to the flow diagram 500 in FIG. 5, which illustrates a method for forwarding the message to the one or more recipients in accordance with an aspect. For example, the method 500 may further describe considerations for performing the forwarding action 406 of FIG. 1. At 502, the method may include determining the format of the message. For example, the server and/or computing device may determine that the message is a SMS message or a message intended for a social media application. The format of the message may determine the manner in which the message is delivered to the one or more recipients. Next, at 504, the method may include determining the contact information for the one or more recipients. The contact information may include, but is not limited to, a telephone number or an address (e.g., an e-mail address, social networking address, or physical address) for the one or more recipients. For example, the computing device and/or server may use the information in a contact list, e.g., contacts stored in a PIM data store, for determining the contact information for the one or more recipients.

Next, at 506, the method may include for each of the one or more recipients determining whether the recipient is capable of receiving the message. For example, the server may compare the format of the message, e.g., SMS or a social media message, with the contact information for the recipient, such as the telephone number and/or address. Thus, the server may determine based upon the contact information whether the recipient is capable of receiving the format of the message.

If the recipient is capable of receiving the message, then at 508, the method may include forwarding the message to the recipient. In an aspect, the recipient may be capable of receiving the message through a variety of manners, such as through the recipient's telephone number and the recipient's e-mail address. The server may be capable of determining an optimal manner for forwarding the message to the recipient. For example, if the message is a SMS message with a URL link and the recipients' wireless device is capable of accessing the internet, then the sever may determine that the optimal manner for delivering the message is through the recipient's wireless device number instead of the recipient's e-mail address. Moreover, determining an optimal manner for forwarding the message may include, but is not limited to, determining the available bandwidth of the network, determining whether the wireless device is roaming in another network, the size of the message, and the availability of the recipient, among other factors. The server may use these factors in determining the manner in which to forward the message to the recipient.

If however, the recipient is not capable of receiving the message, then at 510, the method may include converting the message to a new format. The new format may be a format that the recipient is capable of receiving. For example, if the contact information for the recipient includes a landline telephone and the message is a SMS message, then the server may convert the SMS message into a message with speech and forward the message with speech to the recipient. Moreover, if the recipient's device can handle a different version of the message, then the server may convert the message into a version that the recipient's device is capable of receiving. At 512, the method may include forwarding the new message to the recipient and at 514, notifying the recipient of the message.

In an optional aspect, if the recipient is not capable of receiving the message, the method may include notifying the user that the recipient is not capable of receiving the message. For example, the server may send a message to the wireless device notifying the wireless device that the recipient is not capable of receiving the message. In another optional aspect, the method may include recommending to the recipient a different version of the message if the recipient is not capable of receiving the version of the recommendation that the user forwarded. For example, the server may determine that the recipient is using a wireless device that does not support the version of a game that the user recommended to the recipient. The server may recommend a similar version of the game that is supported by the recipient's wireless device for the recipient to download.

Figure 6:
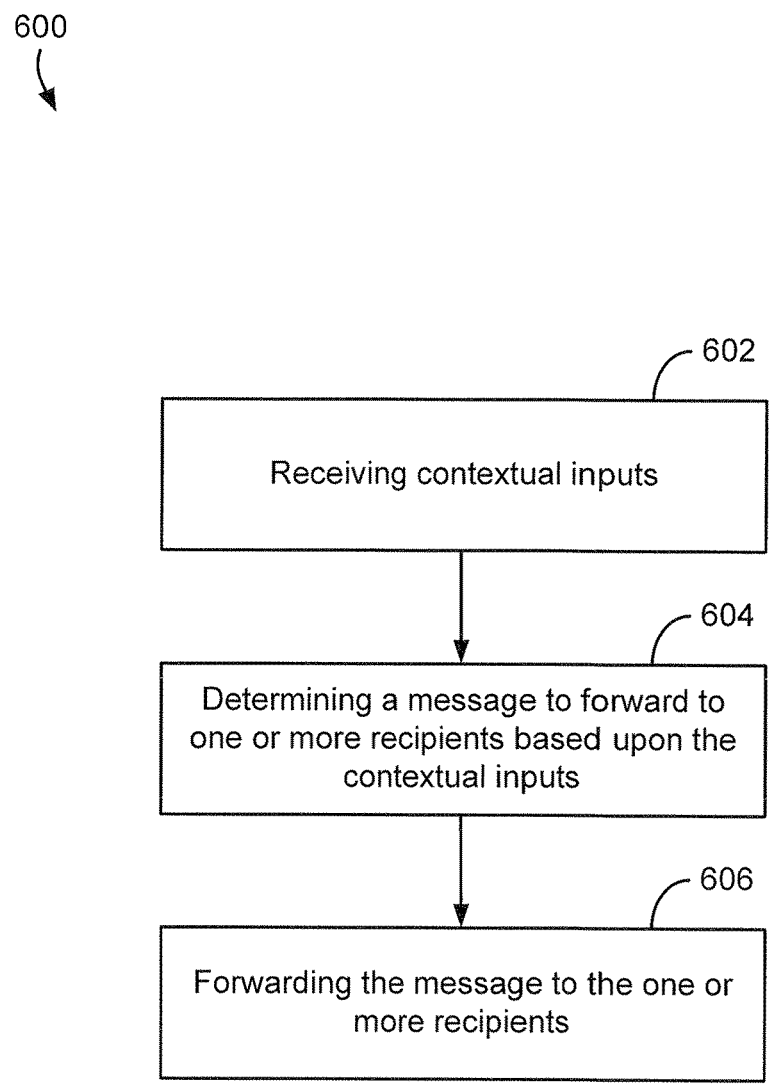
FIG. 6 is a flow chart illustrating a method for determining a message to forward in accordance with another aspect.

Turning now to the flow chart 600 in FIG. 6, which illustrates a method for forwarding a message based upon contextual inputs in accordance with an aspect. For example, the method 600 of FIG. 6 may relate to an aspect of the generation of the message that is received at action 402 in the method of FIG. 4. At 602, the method may include receiving contextual inputs. Contextual inputs may include information regarding the current activities of the user and/or the one or more recipients. The current activities may include, but are not limited to, the time of day, date information (e.g., the day, month and/or year), the location of the wireless device, a game that the user and/or the one or more recipients is playing, an application that the user and/or the one or more recipients is using, or a song or video that the user and/or the one or more recipients is listening to and/or watching, among other current activities. The server and/or wireless device may receive inputs from other wireless device and server components, such as, but not limited to, a clock, a position location module, a camera, a microphone, a thermometer, a memory or database, a wired or wireless communication interface, a keypad, or a touch sensitive display, among others sources of input. In addition, the server and/or wireless device may receive inputs from the user indicating the user's current context.

Next, at 604 and 606, the method may include determining a message to forward to one or more recipients based upon the contextual inputs and forwarding the message to the one or more recipients. As noted above, actions 604 and 660 may relate to method 400 of FIG. 4, where the forwarding 606 may be the same as the forwarding action 406 of FIG. 4. For example, the wireless device may detect that one of the user's contacts is in New York and that the user had previously recommended a restaurant to the contact and may automatically send a message to the recipient with the restaurant information. Another example may include the server determining that a recipient is listening to a song that a user had recommended to the recipient and forwarding another recommendation with another song by the same artists to the recipient. Thus, the current activities of the users and/or recipients may be used to forward a recommendation to the user and/or one or more recipients that are tailored to the current activities.

Figure 7:
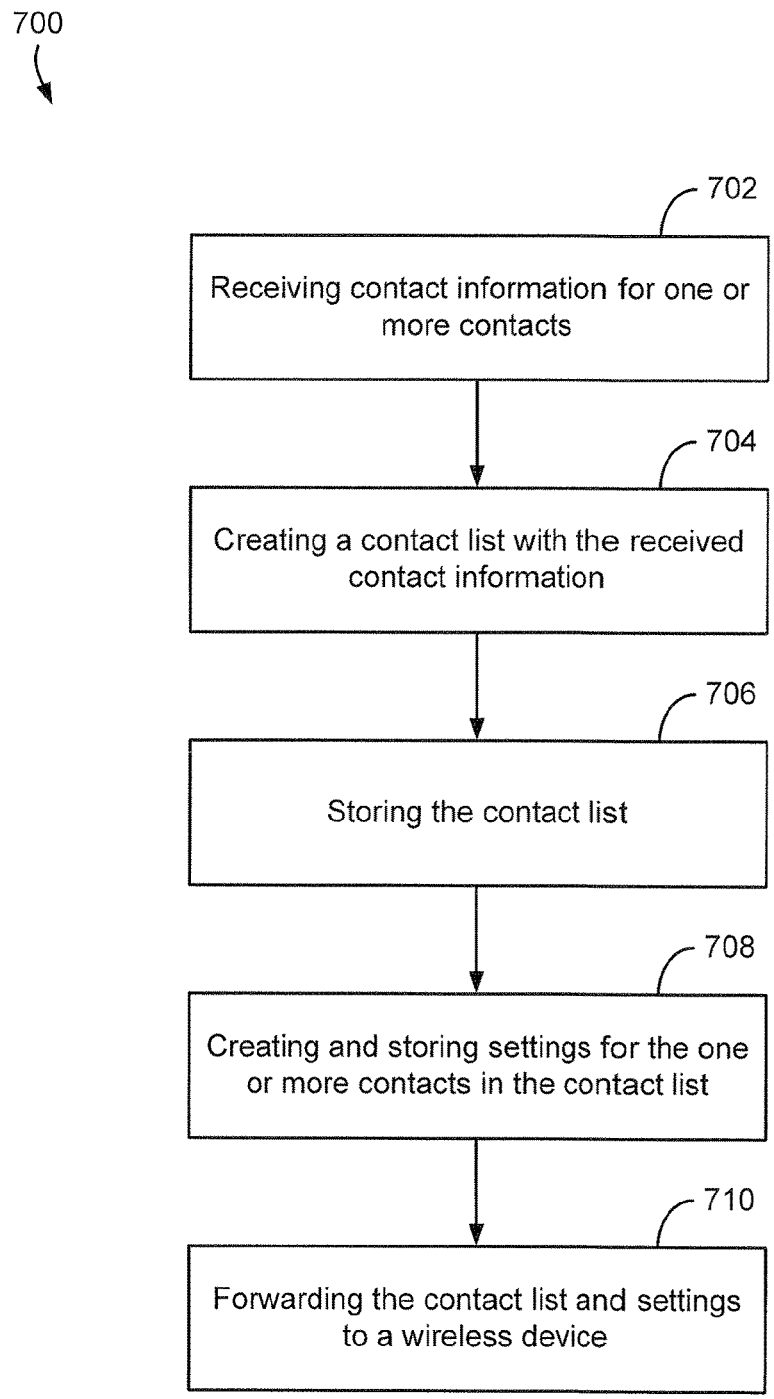
FIG. 7 is a flow chart illustrating a method for receiving contact information in accordance with an aspect.

Referring now to the flow chart 700 in FIG. 7, illustrating a method for creating and storing contacts in accordance with an aspect. At 702, the method includes receiving contact information for one or more contacts. The contact information may include a contact name, contact number and contact address, among other contact information. The contact information may be received via user input and/or may be extracted automatically from the network operator. For example, the contact number may be extracted from the network operator upon receiving a telephone call from the contact.

Next, at 704, the method may include creating a contact list with the received contact information for the one or more contacts. At 706, the method may also include storing the contact list. For example, the server may generate and store a contact list based upon the received contact information.

At 708, the method may also include creating and storing settings for the one or more contacts in the contact list. Settings may include creating groups, such as family, friends, co-workers, among other groups. Thus, the server may store the created settings in the contact list.

Next, at 710, the method may include forwarding the contact list and settings to a wireless device. For example, the server may synchronize with the wireless device forwarding any additions and/or changes to the contact list and settings to the wireless device. Therefore, if the user changes wireless devices, the wireless device is capable of receiving an updated contact list and settings on the new wireless device.

Figure 8:
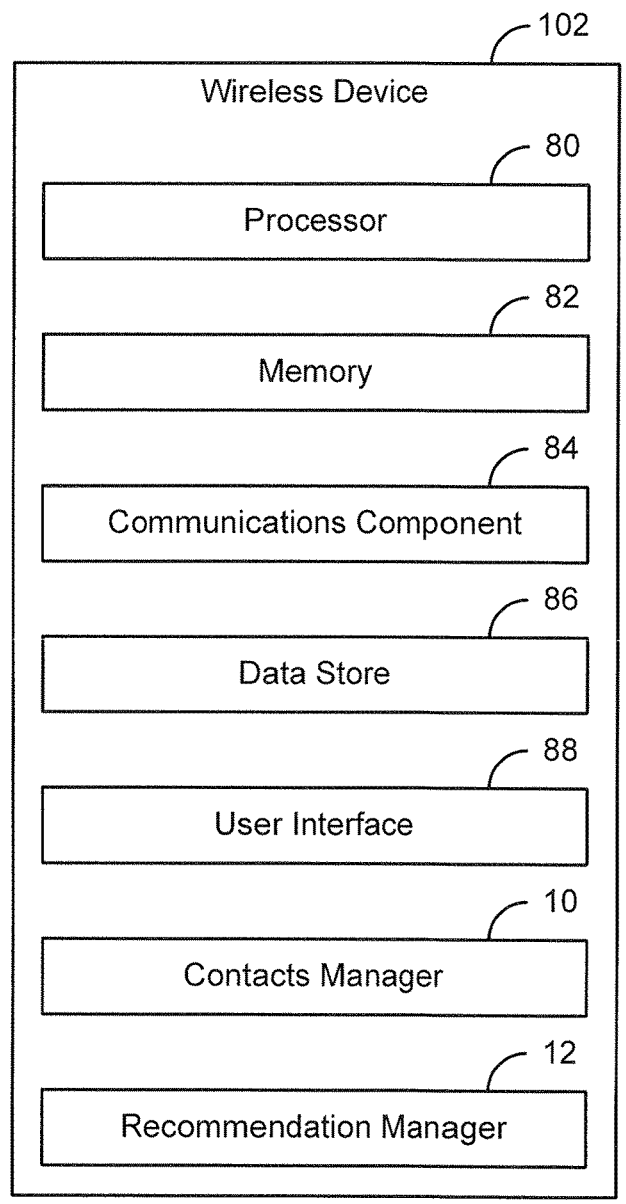
FIG. 8 is an example wireless device operable within the connectivity system in accordance with an aspect.

Referring to FIG. 8, in one aspect, wireless device 102 may include a processor 80 for carrying out processing functions associated with one or more of components and functions described herein. Processor 80 can include a single or multiple set of processors or multi-core processors. Moreover, processor 80 can be implemented as an integrated processing system and/or a distributed processing system.

Wireless device 102 may further includes a memory 82, such as for storing local versions of applications being executed by processor 80. Memory 82 can include a type of memory usable by a computer, such as random access memory (RAM), read only memory (ROM), tapes, magnetic discs, optical discs, volatile memory, non-volatile memory, and any combination thereof.

Further, wireless device 102 includes a communications component 84 that provides for establishing and maintaining communications with one or more parties utilizing hardware, software, and services as described herein. Communications component 84 may carry communications between components on wireless device 102, as well as between wireless device 102 and external devices, such as devices located across a communications network and/or devices serially or locally connected to wireless device 102. For example, communications component 84 may include one or more buses, and may further include transmit chain components and receive chain components associated with a transmitter and receiver, respectively, operable for interfacing with external devices.

Additionally, wireless device 102 may further include a data store 86, which can be any suitable combination of hardware and/or software, that provides for mass storage of information, databases, and programs employed in connection with aspects described herein. For example, data store 86 may be a data repository for applications not currently being executed by processor 80.

Wireless device 102 may additionally include a user interface component 88 operable to receive inputs from a user of wireless device 102, and further operable to generate outputs for presentation to the user. User interface component 88 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 88 may include one or more output devices, including but not limited to a display, a speaker, a haptic feedback mechanism, a printer, any other mechanism capable of presenting an output to a user, or any combination thereof.

Wireless device 102 may also include a contacts manager 10 (FIG. 1) operable for creating, updating and storing contact information, such as contact names, contact numbers, contact addresses, and contact settings. In addition, wireless device may also include a recommendation manager 12 (FIG. 1) operable for receiving one or more recommendations intended for one or more contacts.

Figure 9:
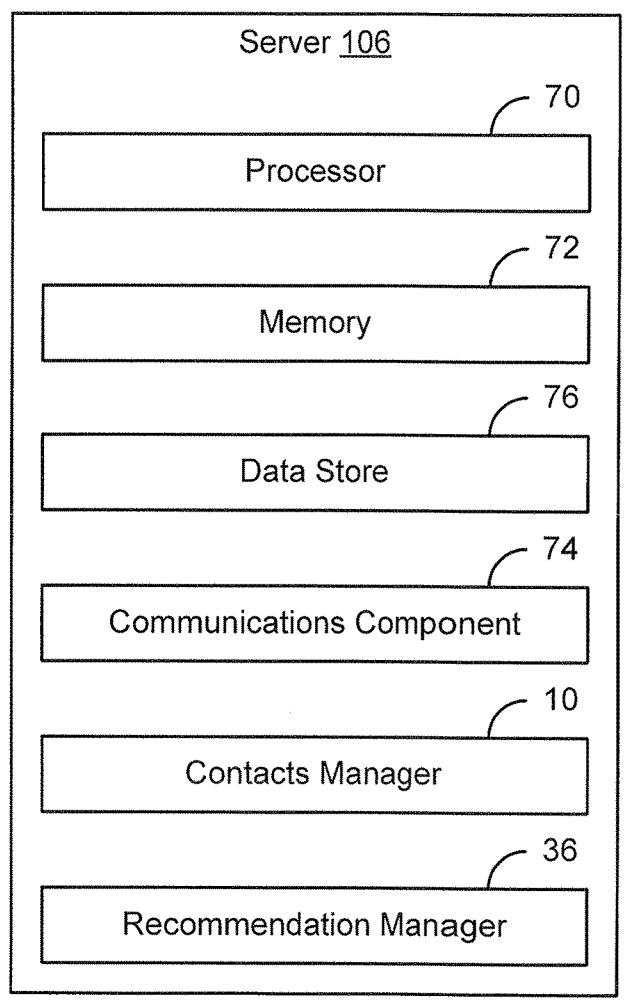
FIG. 9 is an example sever device operable within the connectivity system in accordance with yet another aspect.

Referring now to FIG. 9, illustrated is an example server 106 in accordance with one aspect. Server 106 manages network connectivity matters for access network 104. Server 106 includes processor component 70 for carrying out processing functions associated with one or more of components and functions described herein. Processor component 70 can include a single or multiple set of processors or multi-core processors. Moreover, processing component 70 can be implemented as an integrated processing system and/or a distributed processing system.

Server 106 further includes a memory 72, such as for storing local versions of applications being executed by processor component 70. Memory 72 can include random access memory (RAM), read only memory (ROM), and a combination thereof.

Further, server 106 includes a communications component 74 that provides for establishing and maintaining communications with one or more parties utilizing hardware, software, and services as described herein. Communications component 74 may carry communications between components on server 106, as well as between server 106 and external devices, such as devices located across a communications network and/or devices serially or locally connected to server 106.

Additionally, server 106 may further include a data store 76, which can be any suitable combination of hardware and/or software, that provides for mass storage of information, databases, and programs employed in connection with aspects described herein. For example, data store 76 may be a data repository for applications not currently executing. Server 106 may include a contacts manager component 10 (FIG. 1) operable for creating, updating and storing contact information. In addition, server 106 may also include a recommendation manager 36 operable for receiving recommendations and/or forwarding recommendations to one or more recipients and/or contacts.

Figure 10:
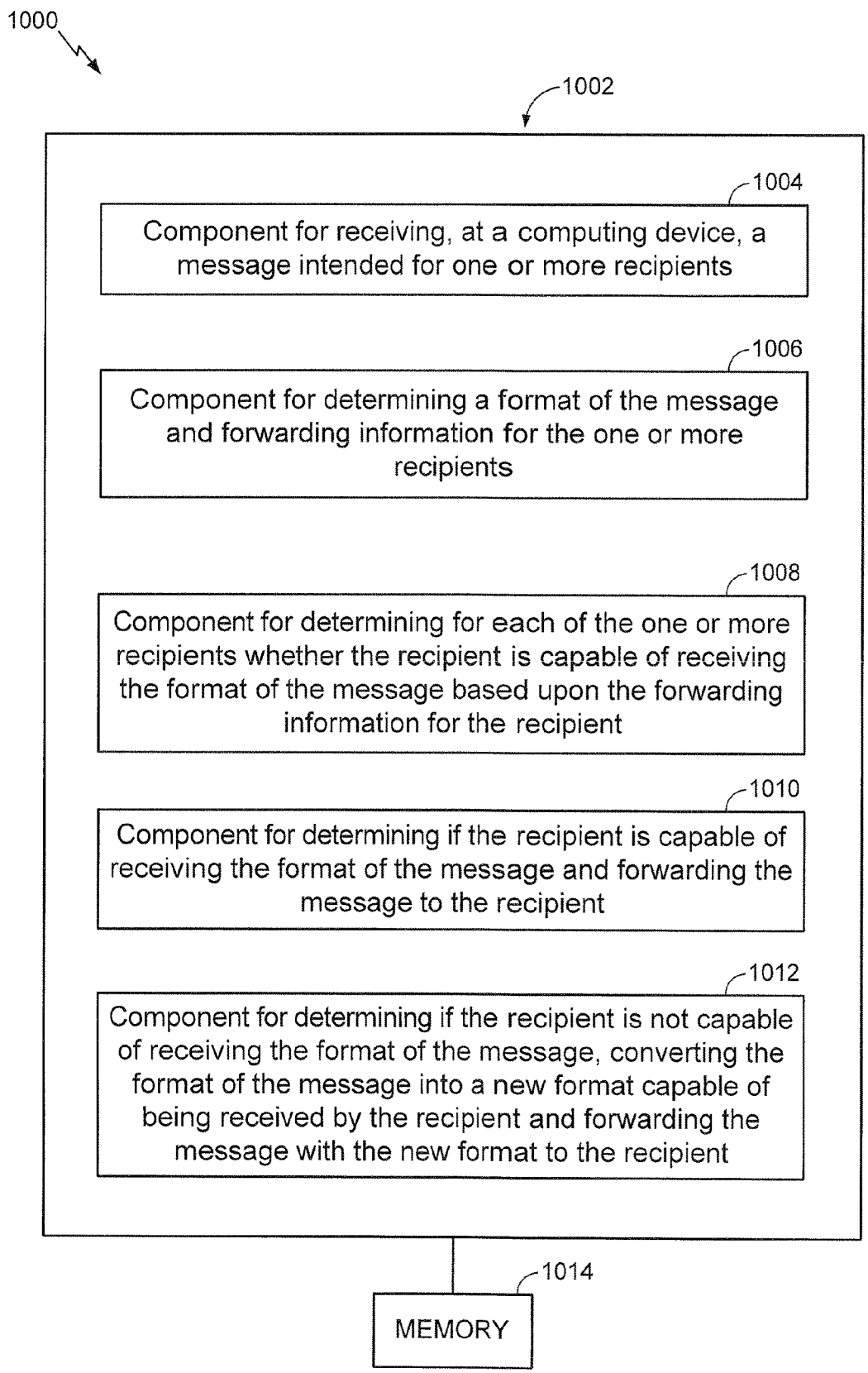
FIG. 10 is an illustration of an example system that facilitates processing messages in accordance with still another aspect.

Referring now to FIG. 10, illustrated is a system 1000 configured to manage content. For example, system 1000 can reside at least partially within a transmitter, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that facilitate processing messages. For instance, logical grouping 1002 may include component 1004 for receiving, at a computing device, a message intended for one or more recipients. Further, logical grouping 1002 may comprise component 1006 for determining a format of the message and forwarding information for the one or more recipients. In addition, logical grouping 1002 may include component 1008 for determining for each of the one or more recipients whether the recipient is capable of receiving the format of the message based upon the forwarding information for the recipient. Logical grouping 1002 may also include component 1010 for determining if the recipient is capable of receiving the format of the message and forwarding the message to the recipient. Logical grouping 1002 may additionally include component 1012 for determining if the recipient is not capable of receiving the format of the message, converting the format of the message into a new format capable of being received by the recipient and forwarding the message with the new format to the recipient. Additionally, system 1000 can include a memory 1014 that retains instructions for executing functions associated with electrical components 1004, 1006, 1008, 1010 and 1012. While shown as being external to memory 1014, it is to be understood that one or more of electrical components 1004, 1006, 1008, 1010 and 1012 can exist within memory 1014.

One variation may include the recipient creating a profile with settings indicating which recommendations the recipient wishes to receive. For example, the recipient may only want to receive recommendations relating to a particular activity, e.g., sports and/or music. In addition, the recipient may only want to receive recommendations for a particular location. Thus, the server and/or wireless device may filter the recommendations intended for the recipient based upon the recipient's profile and forwarding only those recommendations that are within the parameters of the user's profile.

Another variation may include identifying when two users are using the same application and/or game. For example, an icon may identify a group of contacts that play the same game. Thus, one variation may include displaying the group icon when more than one member of the group is playing the game. Therefore, the users who are playing the game may identify the other members of the group that are currently playing the game.

An additional variation may include creating groups of contacts based upon recommendations. For example, a contact recommends from a group for playing games recommends the game a new contact, the new contact may be added to the group as well. Thus, the groups may expand based upon the recommendations forwarded by other members of the group.

Another variation may include posting the recommendation on a social network site associated with the user, e.g., FACEBOOK™ and/or TWITTER™. Thus, in addition to forwarding the recommendation to the one or more selected recipients, as discussed above, the recommendation may also be posted on one or more social network sites associated with the user of the wireless device.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for processing messages, comprising:
    storing a search history for a user of a computing device;
    receiving, at the computing device, a message intended for one or more recipients, the message including a recommendation comprising at least one of an application stored on a device, a voice message, a song, a video, a URL link, a message, a short message service (SMS) message, a multimedia messaging service (MMS) message, or any combination thereof, the message based upon the search history;
    searching the search history based upon a criterion;
    generating a report analyzing the recommendation based upon results of the searching;
    determining a format of the message and forwarding information for the one or more recipients; and
    determining for each of the one or more recipients whether the recipient is capable of receiving the format of the message based upon the forwarding information for the recipient;
    receiving information relating to a recipient response to the recommendation the information relating to the recipient response comprising information relating to one of purchasing the application, listening to the voice message, listening to the song, viewing the video, and selecting the URL link; and
    determining a rating for the recommendation, the rating based on a number of recipients who respond to the recommendation;
    wherein, for each recipient determined to be capable of receiving the format of the message, forwarding the message to each such recipient; and
    wherein, for each recipient determined not to be capable of receiving the format of the message, generating a new message based on the message, the new message in a new format capable of being received by the recipient and forwarding the new message to each such recipient.

2. The method of claim 1, wherein the forwarding information comprises at least one of a mobile telephone number, a social networking address, an internet address, an e-mail address, or a landline telephone number.

3. The method of claim 1, wherein the one or more recipients are selected from contact information on a device providing the received message.

4. The method of claim 3, wherein the one or more recipients are selected from a group in the contact information.

5. The method of claim 1, further comprising generating reward points usable towards purchasing additional applications based on the number of recipients who respond.

6. The method of claim 1, further comprising:
    determining whether the message destined for the one or more recipients should be filtered to stop delivery of the message; and stopping delivery of the message based upon the determining.

7. The method of claim 6, wherein the filtering is based upon location information.

8. The method of claim 1, further comprising:
   determining a social network site associated with a user providing the message; and
   posting the recommendation on the social network site.

9. The method of claim 1, further comprising generating a notification that the recipient is unable to receive the format of the message if the recipient is not capable of receiving the format of the message.

10. The method of claim 1, wherein the forwarding further comprises determining an optimal manner to forward the message to the recipient.

11. The method of claim 1, further comprising:
    obtaining a current location for the computing device,
    wherein the message is based upon the current location of the computing device.

12. The method of claim 1, wherein the search history further includes additional comments provided by the user.

13. The method of claim 1, wherein receiving comprises receiving the message from a wireless device at a network server; and
    wherein at least one of the determining the format of the message and the determining whether the recipient is capable of receiving the format of the message is performed at the network server.

14. The method of claim 1, wherein receiving comprises receiving the message at a wireless device; and
    wherein at least one of the determining the format of the message and the determining whether the recipient is capable of receiving the format of the message is performed at the wireless device.

15. At least one processor configured to process messages, the processor comprising:
    a storage module configured to store a search history for a user of a computing device;
    a first module for receiving, at the computing device, a message intended for one or more recipients, the message including a recommendation comprising at least one of an application stored on a device, a voice message, a song, a video, a URL link, a message, a short message service (SMS) message, a multimedia messaging service (MMS) message, or any combination thereof, the message based upon the search history;
    a search module configured to search the search history based upon a criterion;
    a reporting module configured to generate a report analyzing the recommendation based upon results of the search;
    a second module for determining a format of the message and forwarding information for the one or more recipients;
    a third module for determining for each of the one or more recipients whether the recipient is capable of receiving the format of the message based upon the forwarding information for the recipient;
    a fourth module for receiving information relating to a recipient response to the recommendation the information relating to the recipient response comprising information relating to one of purchasing the application, listening to the voice message, listening to the song, viewing the video, and selecting the URL link; and
    a fifth module for determining a rating for the recommendation, the rating based on a number of recipients who respond to the recommendation;
    wherein, for each recipient determined to be capable of receiving the format of the message, forwarding the message to each such recipient; and
    wherein, for each recipient determined not to be capable of receiving the format of the message, generating a new message based on the message, the new message in a new format capable of being received by the recipient and forwarding the new message to each such recipient.

16. A computer program product, comprising:
    a non-transitory computer-readable medium comprising:
    a storage set of codes for causing a computer to store a search history for a user of the computer;
    a first set of codes for causing the computer to receive, at a computing device, a message intended for one or more recipients, the message including a recommendation comprising at least one of an application stored on a device, a voice message, a song, a video, a URL link, a message, a short message service (SMS) message, a multimedia messaging service (MMS) message, or any combination thereof, the message based upon the search history;
    a search set of codes for causing the computer to search the search history based upon a criterion;
    a report set of codes for causing the computer to generate a report analyzing the recommendation based upon results of the search;
    a second set of codes for causing the computer to determine a format of the message and forwarding information for the one or more recipients;
    a third set of codes for causing the computer to determine for each of the one or more recipients whether the recipient is capable of receiving the format of the message based upon the forwarding information for the recipient;
    a fourth set of codes for receiving information relating to a recipient response to the recommendation the information relating to the recipient response comprising information relating to one of purchasing the application, listening to the voice message, listening to the song, viewing the video, and selecting the URL link; and
    a fifth set of codes for determining a rating for the recommendation, the rating based on a number of recipients who respond to the recommendation;
    wherein, for each recipient determined to be capable of receiving the format of the message, forwarding the message to each such recipient; and
    wherein, for each recipient determined not to be capable of receiving the format of the message, generating a new message based on the message, the new message in a new format capable of being received by the recipient and forwarding the new message to each such recipient.

17. An apparatus, comprising:
    means for storing a search history for a user of a computing device;
    means for receiving, at the computing device, a message intended for one or more recipients, the message including a recommendation comprising at least one of an application stored on a device, a voice message, a song, a video, a URL link, a message, a short message service (SMS) message, a multimedia messaging service (MMS) message, or any combination thereof, the message based upon the search history;
    means for searching the search history based upon a criterion;

means for generating a report analyzing the recommendation based upon results of the searching;
means for determining a format of the message and forwarding information for the one or more recipients;
means for determining for each of the one or more recipients whether the recipient is capable of receiving the format of the message based upon the forwarding information for the recipient;
means for receiving information relating to a recipient response to the recommendation the information relating to the recipient response comprising information relating to one of purchasing the application, listening to the voice message, listening to the song, viewing the video, and selecting the URL link; and
means for determining a rating for the recommendation, the rating based on a number of recipients who respond to the recommendation;
wherein, for each recipient determined to be capable of receiving the format of the message, forwarding the message to each such recipient; and
wherein, for each recipient determined not to be capable of receiving the format of the message, generating a new message based on the message, the new message in a new format capable of being received by the recipient and forwarding the new message to each such recipient.

18. An apparatus for processing messages, comprising:
a transaction history data store operable for storing a search history for a user;
a recommendation component, at least partially implemented in hardware, operable for receiving a message intended for one or more recipients, the message including a recommendation comprising at least one of an application stored on a device, a voice message, a song, a video, a URL link, a message, a short message service (SMS) message, a multimedia messaging service (MMS) message, or any combination thereof, the message based upon the search history, wherein the transaction history data store is further operable for searching the search history based upon a criteria and generating a report analyzing the recommendation based upon results of the searching;
a forwarding component, at least partially implemented in hardware, operable for determining a format of the message and forwarding information for the one or more recipients; and
the forwarding component, at least partially implemented in hardware, operable for determining for each of the one or more recipients whether the recipient is capable of receiving the format of the message based upon the forwarding information for the recipient;
a transaction history data store operable for receiving information relating a recipient response to the recommendation wherein the information relating to the recipient response comprises one of purchasing the application, listening to the voice message, listening to the song, viewing the video, and selecting the URL link; and
a rating component, at least partially implemented in hardware, operable for rating the recommendation, wherein the rating comprises determining a number of recipients who respond to the recommendation;
wherein, for each recipient determined to be capable of receiving the format of the message, forwarding the message to each such recipient; and
wherein, for each recipient determined not to be capable of receiving the format of the message, generating a new message based on the message, the new message in a new format capable of being received by the recipient and forwarding the new message to each such recipient.

19. The apparatus of claim 18, wherein the forwarding information comprises at least one of a mobile telephone number, a social networking address, an internet address, an e-mail address, or a landline telephone number.

20. The apparatus of claim 18, wherein the one or more recipients are selected from contact information on a mobile device.

21. The apparatus of claim 20, wherein the one or more recipients are selected from a group in the contact information.

22. The apparatus of claim 18, wherein the rating component is further configured to generate reward points usable towards purchasing additional applications based on the number of recipients who respond.

23. The apparatus of claim 22, further comprising:
a transaction history data store component, at least partially implemented in hardware, operable for determining whether the message destined for the one or more recipients should be filtered to stop delivery of the message; and
stopping delivery of the message based upon the determining.

24. The apparatus of claim 23, wherein the filtering is based upon location information.

25. The apparatus of claim 18, wherein the forwarding is further operable for determining a social network site associated with a user providing the message; and
posting the recommendation on the social network site.

26. The apparatus of claim 18, wherein upon the determining that the recipient is not capable of receiving the format of the message, a mobile device is notified that the recipient is unable to receive the format of the message.

27. The apparatus of claim 18, wherein the forwarding component is further configured to determine an optimal manner to forward the message to the recipient.

28. The apparatus of claim 18, further comprising:
a recommendation manager, at least partially implemented in hardware, operable for obtaining a current location for a mobile device and wherein the message is based upon the current location of the mobile device.

29. The apparatus of claim 18, wherein the search history further includes additional comments provided by the user.

30. The apparatus of claim 18, wherein the recommendation component is located on a network server and receives the message from a wireless device; and
wherein the forwarding component is located on the network server.

31. The apparatus of claim 18, wherein the recommendation component is located on a wireless device; and
wherein the forwarding component is located on the wireless device.

* * * * *